United States Patent Office 2,977,347
Patented Mar. 28, 1961

2,977,347

POLYMERIZATION OF OLEFINS WITH MOLYBDENUM PENTACHLORIDE CATALYST

Leon S. Minckler, Jr., Metuchen, and Lawrence T. Eby, Linden, N.J., assignors to Esso Research and Engineering Company, a corporation of Delaware No Drawing. Filed Dec. 24, 1956, Ser. No. 630,068

13 Claims. (Cl. 260—85.3)

This invention relates to a low temperature polymerization process for a polymerizable monomer having olefinic unsaturation and, more particularly, the process relates to a novel catalyst consisting essentially of molybdenum pentachloride which is used as the active catalytic agent in the low temperature polymerization of an olefinic material having either a straight chain or an iso structure, either polymerized alone or copolymerized with a second olefin or multiolefin, particularly a diolefin, to form both homopolymers and copolymers.

It is known to produce a polymer of an olefin such as, for instance, propylene or isobutylene, by polymerizing these olefins either alone or in some cases with a monoolefin such as styrene, or methyl styrene, or a multiolefin such as, for example, isoprene or butadiene at temperatures ranging from 50° C. to −150° C. by the application thereto of the well-known Friedel-Crafts type of catalyst, the catalyst preferably being in solution in a low-freezing, non-complex-forming solvent. The resulting polymerization reaction yields useful products varying from oils to solid rubber-like polymers and inelastic resins of molecular weight substantially greater than that of the olefinic monomers. Other olefins which may be used alone or in mixtures for polymerizations include αp-dimethyl styrene, p-chloro-styrene, piperylene, dimethyl, butadiene, cyclopentadiene, 2-methyl pentadiene-1,3 and vinyl ethers such as vinyl methyl ether and vinyl hexyl ether.

It has now been found that anhydrous molybdenum pentachloride is an excellent catalyst for polymerizing olefins. This discovery was unpredictable in view of the fact that molybdenum trichloride as well as other metal chlorides, such as antimony pentachloride, arsenic trichloride, bismuth trichloride, chromic chloride, columbium pentachloride and vanadium tri and tetrachlorides, which are near molybdenum in the periodic table, do not polymerize under the same conditions hereinafter set forth.

Among the polymerization reactions in which the novel polymerization catalyst of the present invention is applicable is the polymerization of olefins having from 3 to 14, inclusive, carbon atoms per molecule, and preferably between 3 to 8, inclusive, carbon atoms per molecule. The invention is valuable for polymerization of olefins or isoolefins alone to form homopolymers. Among the olefins which can be polymerized by molybdenum pentachloride is propylene, which under the influence of this catalyst at reduced temperatures, forms oily to resinous polymerized products. The formation of homopolymers of the isoolefins, such as isobutylene, is of particular importance and can be carried out using molybdenum pentachloride in solution as the polymerization catalyst and employing the well-known techniques and conditions for the production of such homopolymers.

Control of the reaction to form the homopolymer is essential in order to prevent the formation of polymers having molecular weights which are either too high or too low.

It is generally desirable to employ a diluent for the reaction and practically any inert, non-complexing solvent having a freezing point below 0° C. can be used. The mono- and polyalkyl halides, particularly the chlorides and fluorides having from 1 up to 4 or 5 carbon atoms, have been found especially useful. The amount of halogen present may vary from one atom per molecule up to the replacement of one-half of the hydrogen atoms by halogen atoms. In the polymerization of isobutylene, for instance, the resulting product may vary from a sticky or semi-solid material to one of solid and rubber-like consistency, depending upon catalyst concentration and temperatures employed. The product is colorless and clear and soluble in liquid hydrocarbons. Polymerized products prepared from isobutylene having a Staudinger molecular weight of between 1,000 and 500,000 are possible.

It is further contemplated to use molybdenum pentachloride as the catalyst in polymerization reactions for preparing tough, thermoplastic copolymers from an isoolefin having from 4 to 8, inclusive, carbon atoms per molecule, such as iso-amylene or preferably isobutylene, copolymerized with a styrene, such as alpha-methyl styrene, para-methyl styrene, or preferably with styrene itself. These resinous copolymers are prepared by polymerizing a mixture of 5 to 80, preferably 10 to 60, weight percent of styrene with the balance of the isoolefin at low temperatures, preferably between about −60° C. and −150° C., using dissolved molybdenum pentachloride as the catalyst. It is usually desirable to prepare the catalyst in the form of a solution having from 0.01 up to 5% concentration of the active catalyst present. Methyl chloride is especially advantageous for use as the catalyst diluent, although other suitable solvents such as other mono- or poly-halogenated alkanes of 1 to 3 carbon atoms, which are unreactive and liquid at the polymerization temperature may also be employed to assist in solubilizing the molybdenum pentachloride catalyst. Liquids which may be employed include methyl bromide, methyl chloride, methylene chloride, ethyl chloride, ethylidene difluoride and the like.

In preparing these iso-olefin-styrene copolymers, it is usually desirable to dilute the reactive monomers of the polymerization mixture with about 1 to 10, preferably 2 to 5, volumes of an inert diluent per volume of reactive olefinic feed. The polymerization mixture is cooled either internally or externally and the catalyst added to the cold polymerization mixture. The general technique of preparing this type of styrene copolymer is well known and broadly described in United States Patent 2,274,749.

As a further type of polymer which may be prepared by polymerization employing molybdenum pentachloride as the catalyst, there may be included the low temperature polymerization process in which an iso-olefin and a multiolefin, particularly a conjugated diolefin, are polymerized to form interpolymers. It is well known that a valuable rubbery interpolymer may be produced by copolymerizing a major proportion of an iso-olefin having from 4 to 8, inclusive, carbon atoms per molecule, such as isobutylene, with a minor proportion of a multi-olefin, preferably a conjugated diolefin such as butadiene or isoprene, at temperatures ranging from 0° C. to −150° C., by the application thereto of a Friedel-Crafts catalyst, the catalyst preferably being in solution in a low-freezing, non-complex-forming solvent. The general technique is broadly described in United States Patent 2,356,128. The resulting polymerization reaction yields solid, rubber-like polymers of high molecular weight which are reactive with vulcanizing agents such as sulfur in a curing reaction somewhat analogous to a vulcanization of natural rubber.

In order to produce this interpolymer, about 50 to 99.5 weight percent of an iso-olefin having 4 to 6 carbon atoms, such as isobutylene, 2-methyl butene-1, 2-methyl pentene-1, and 2-methyl hexene-1, is mixed with from about 0.5 to 50 weight percent of a multi-olefin having 4 to 12 carbon atoms, preferably a conjugated diolefin, such as butadiene or isoprene. Other multi-olefins which may be used, however, include piperylene, dimethyl butadiene, cyclopentadiene, divinylbenzene, dimethallyl, or mycene. For most purposes, the conjugated diolefins having from 4 to 6, carbon atoms are preferred. A preferred reaction mixture consists of a major proportion of iso-olefin admixed with a minor proportion of diolefin such as 0.5–5% of isoprene or 10–50% of butadiene. By the use of more diolefin in the reaction mixture, more unsaturated products can be obtained. The olefinic reaction mixture, usually diluted with 1 to 3 volumes of inert diluent per volume of mixture, is cooled to a temperature within the range of from $-20°$ C. to $-100°$ C. or even as low as $-150°$ C. either externally by the use of a refrigerating jacket around the reactor or internally by admixture with the polymerizable olefins of a refrigerant such as liquid propane, liquid ethane, liquid ethylene, or even liquid methane, or solid carbon dioxide.

The polymerization of the thus prepared cold olefin reaction mixture is caused to occur by application thereto of molybdenum pentachloride, particularly in solution in a suitable solvent. It is preferred that the solvent chosen not form a complex with the catalyst. It should also remain substantially liquid at the polymerization temperature. Furthermore, the solvent should preferably dissolve the molybdenum pentachloride to the extent of about 0.05 gram per 100 cc. of solvent.

The catalyst solution of molybdenum pentachloride dissolved in a solvent consisting of a suitable solvent such as methyl chloride or ethylidene difluoride may be applied to the cold mixed olefinic material in the form of a spray delivered onto the surface of the rapidly stirred olefinic polymerization mixture. Alternatively, the catalyst solution may be delivered as a jet into a zone of high turbulence in the olefinic material in any convenient way or it may be delivered in any convenient manner which obtains a rapid dispersion of the catalyst solution into the cold olefinic mixture. A range of catalyst concentration of from 0.01 gram to 5 grams of molybdenum pentachloride per 100 cc. solvent can be used, the preferred concentrations being from 0.05 to 1 gram of molybdenum pentachloride per 100 cc. of solvent.

As a specific example of a favored manner for preparing the catalyst solution for the polymerization reaction, a solution can be made by mixing about 1 gram of molybdenum pentachloride with 100 cc. of methyl chloride, boiling a few minutes and filtering.

The quantity of molybdenum pentachloride catalyst necessary in a given polymerization will vary with the feed, concentration of reactants, etc. However, for general purposes amounts in the range of about 0.1 to 10 parts by weight, preferably about 0.1 to 2 parts by weight, per 100 parts by weight of monomer may be employed. If there are impurities in the olefin feed, larger amounts of catalyst may be necessary to overcome them.

Polymers and copolymers prepared using this novel polymerization catalyst, may be brought up to room temperature from the temperature of the polymerization mixture in any convenient manner. One preferred procedure is to dump the entire reaction mixture into warm water or a warm alkaline aqueous solution or warm alcohol or the like in order to flash off remaining monomers and other volatile ingredients present in the reaction mixture, precipitate the polymer, quench the catalyst, and start the purification of the remaining polymerized product. The solid polymer is then finished by washing on a roll mill or kneader with clear water to obtain further and more complete purification or it may, if desired, be purified in any number of well-known ways.

The invention will be better understood by referring to the following examples which serve to illustrate various embodiments of it.

EXAMPLE 1

Several polyisobutylenes were prepared with a catalyst solution made by boiling an excess of anhydrous molybdenum pentachloride in methyl chloride (B.P. $-24°$ C.) for 20 minutes and filtering. The filtrate was placed in a stainless steel blow case, packed in Dry Ice and under nitrogen pressure and syrayed into the olefin feed in a copper reactor through a nozzle which formed a fine stream. The amount of catalyst and rate of addition was measured by means of a rotameter located between the blow case and nozzle. The reactor, which was 4 inches in diameter and 10 inches deep, was equipped with a strainless steel stirrer, nitrogen inlet tube and thermocouple. The reaction temperature was maintained by submerging the reactor in a liquid cooling medium. After the polymerization had reached the desired stage, the reaction mixture was poured into isopropyl alcohol to remove the catalyst, the polymer was recovered by filtration and dried in a vacuum oven. The catalyst solution used in each run consisted of 0.08 gram of molybdenum pentachloride dissolved in 100 ml. of methyl chloride.

In run #1, 200 grams of isobutylene were fed into the reactor and polymerized in the presence of 315 ml. of catalyst solution. The solid polymer recovered weighed 66 grams. In run #2, 100 grams of isobutylene were polymerized in the presence of 216 ml. of catalyst solution and produced 97 grams of polymer. Run #3 was the same as run #1 except more catalyst solution was added (360 ml.) and the feed diluent was pentane instead of methyl chloride. The catalyst efficiencies, as determined by dividing the amount of polymer formed by the weight of catalyst used, and the intrinsic viscosity of the polyisobutylenes are set forth in Table I.

*Table I*

| Run # | Feed Diluent | Polymerization Temperature, °C. | Catalyst Efficiency | Intrinsic Viscosity @ 20° C. |
|---|---|---|---|---|
| 1 | Methyl Chloride | −100 | 260 | 6.23 |
| 2 | do | −28 | 570 | 0.84 |
| 3 | Pentane | −100 | 350 | 2.15 |

The intrinsic viscosity was measured by dissolving a 20 mg. sample of polymer in 20 ml. of diisobutylene and determining its viscosity at 20° C. in a Ubbelode viscometer.

EXAMPLE 2

Isobutylene-isoprene copolymers were prepared according to the procedure set forth in Example 1. In each case the feed, which was composed of 200 grams of isobutylene and 6 grams of isoprene, was diluted with 3 parts by volume of methyl chloride per 1 part by volume of monomers and polymerized with 288 ml. of catalyst solution. The catalyst efficiency and intrinsic viscosity of the 80 grams of copolymer produced are shown in Table II.

*Table II*

| Polymerization Temperature | Catalyst Efficiency | Intrinsic Viscosity @ 20° C. | Unsaturation, Mole Percent |
|---|---|---|---|
| −51° C. | 350 | 0.61 | 1.4 |

EXAMPLE 3

Polystyrene was prepared according to the method outlined in Example 1. The styrene feed (100 grams) was diluted with 3 parts by volume of methyl chloride per 1 part by volume of monomer and polymerized with 360 ml. of catalyst solution. At a reaction temperature of —75° C., the catalyst efficiency was 25 and the intrinsic viscosity of the 7 grams of polymer produced was 0.78 at 20° C.

The invention is not limited to the foregoing examples, but rather resort may be had to various modifications and variations without departing from the spirit of the discovery or scope of the appended claims.

What is claimed is:

1. A process for preparing a polymer which comprises polymerizing at a temperature between about 50 and —150° C., a hydrocarbon olefin feed selected from the group consisting of (a) a monoolefin, (b) a mixture of monoolefins, and (c) a mixture of a monoolefin and a diolefin; all of said olefins having from 3 to 14 carbon atoms, in the presence of molybdenum pentachloride and recovering a hydrocarbon polymer having a molecular weight of at least 1000 Staudinger.

2. A process according to claim 1 in which the polymerization is carried out in the presence of an inert, non-complexing organic diluent having from 1 to 5 carbon atoms.

3. A process according to claim 1 in which the olefin feed is a monoolefin.

4. A process according to claim 1 in which olefin feed is a mixture of an isoolefin and a diolefin.

5. A process according to claim 1 in which the olefin feed is a mixture of isobutylene and a conjugated $C_4$ to $C_6$ diolefin.

6. A process for preparing a polymer which comprises contacting 100 parts by weight of a hydrocarbon olefin feed selected from the group consisting of (1) a monoolefin, (2) a mixture of monoolefins, (3) a mixture of a monoolefin and a diolefin; all of said olefins having from 3 to 14 carbon atoms at a temperature between about 50 and —150° C. in the presence of a catalyst solution until said olefin polymerizes, said catalyst solution containing about 0.1 to 10 parts by weight of molybdenum pentachloride catalyst and an inert, non-complexing organic diluent having from 1 to 5 carbon atoms, flashing off the diluent and unpolymerized olefins and quenching the molybdenum pentachloride.

7. A process according to claim 6 in which the catalyst is present in a dissolved form.

8. A process according to claim 6 in which the diluent is a halogenated alkane having 1 to 3 carbon atoms.

9. A process according to claim 6 in which the catalyst solution contains not more than about 2 parts by weight of molybdenum pentachloride.

10. A process according to claim 6 in which the olefin is a $C_3$ to $C_8$ monoolefin and the polymer is a homopolymer.

11. A process according to claim 6 in which the polymerization temperature is between about —60 and —150° C.

12. A process for preparing solid, rubber-like interpolymers composed of isobutylene and $C_4$ to $C_6$ conjugated diolefin which comprises contacting 100 parts by weight of olefin feed containing about 50 to 99.5 wt. percent of isobutylene and 0.5 to 50 wt. percent of said conjugated diolefin with about 0.1 to 10 parts by weight of molybdenum pentachloride catalyst dissolved in a lower alkyl halide diluent at a temperature between about —20 and —150° C. until the olefin feed copolymerizes, flashing off the diluent and unpolymerized olefin, quenching the molybdenum pentachloride catalyst and recovering a solid rubber-like interpolymer.

13. A process according to claim 12 in which the conjugated diolefin is isoprene.

References Cited in the file of this patent

UNITED STATES PATENTS

| | | |
|---|---|---|
| 2,076,201 | Langedijk et al. | Apr. 6, 1937 |
| 2,092,295 | Van Peski et al. | Sept. 7, 1937 |
| 2,142,980 | Huijser et al. | Jan. 3, 1939 |
| 2,444,848 | Purvin | July 6, 1948 |
| 2,474,571 | Brakeley et al. | June 28, 1949 |
| 2,494,766 | Lightbown et al. | Jan. 17, 1950 |
| 2,887,473 | Balthis | May 19, 1959 |
| 2,891,040 | Linn | June 16, 1959 |

OTHER REFERENCES

Kashtanov: Journal of General Chem. (USSR), vol. 3, pp. 229–33 (1933). Abstracted from: Chem. Abs., vol. 28 (1934), p. 1687(3).

Dermer et al.: J.A.C.S., vol. 64, pp. 464–65 (1942). Abstracted from: Chem. Abs., vol. 36 (1942), p. 1911(9).